US008391307B2

(12) United States Patent
Karmakar et al.

(10) Patent No.: US 8,391,307 B2
(45) Date of Patent: *Mar. 5, 2013

(54) METHOD FOR HANDLING COMMUNICATIONS OVER A NON-PERMANENT COMMUNICATION LINK

(75) Inventors: Srimantee Karmakar, Mississauga (CA); Jeffrey Rogers, Scarborough (CA); Kamen B. Vitanov, Mississauga (CA); Viera Bibr, Kilbride (CA); Michael Shenfield, Richmond Hill (CA); Brindusa L. Fritsch, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,928

(22) Filed: Mar. 14, 2012

(65) Prior Publication Data
US 2012/0173652 A1    Jul. 5, 2012

Related U.S. Application Data

(63) Continuation of application No. 11/405,594, filed on Apr. 18, 2006, now Pat. No. 8,155,133.

(60) Provisional application No. 60/672,082, filed on Apr. 18, 2005.

(51) Int. Cl.
*H04L 12/28* (2006.01)
(52) U.S. Cl. ........................................ 370/412
(58) Field of Classification Search ........................ None
See application file for complete search history.

(56) References Cited

U.S. PATENT DOCUMENTS

| 6,349,093 | B1 |  | 2/2002 | Caldwell et al. |
| 6,393,489 | B1 |  | 5/2002 | Sambamurthy et al. |
| 7,352,706 | B2 | * | 4/2008 | Klotz et al. .................. 370/254 |
| 2002/0107991 | A1 | * | 8/2002 | Maguire et al. ............... 709/250 |
| 2003/0112824 | A1 | * | 6/2003 | Acosta ........................ 370/474 |
| 2003/0211852 | A1 |  | 11/2003 | Vidallac |
| 2003/0237018 | A1 |  | 12/2003 | Baba |
| 2004/0057389 | A1 |  | 3/2004 | Klotz et al. |
| 2005/0036477 | A1 | * | 2/2005 | Jiang ............................ 370/350 |
| 2005/0085219 | A1 | * | 4/2005 | Noldus ...................... 455/412.1 |
| 2006/0194596 | A1 | * | 8/2006 | Deng .......................... 455/466 |

FOREIGN PATENT DOCUMENTS

| GB | 2404301 A | 1/2005 |
| WO | 0133407 A2 | 5/2001 |
| WO | 03055240 A1 | 7/2003 |

OTHER PUBLICATIONS

Canadian Intellectual Property Office, "Examiner's Requisition" for corresponding CA Patent Application No. 2,562,182, dated Mar. 5, 2009, Canada.
Ogilvy Renault LLP, "Response to Examiner's Requisition of Mar. 5, 2009" for corresponding CA Patent Application No. 2,562,182, dated Sep. 2, 2009, Canada.
State Intellectual Property Office of People's Republic of China, "First Office Action" for corresponding CN Patent Application No. 200680000245.8, dated Feb. 12, 2010, China.

(Continued)

*Primary Examiner* — John Blanton
(74) *Attorney, Agent, or Firm* — Norton Rose Canada LLP

(57) ABSTRACT

A method is disclosed for handling communications over a non-permanent communication link. The method comprising centrally receiving a message to transmit from a plurality of applications, checking the availability of the non-permanent communication link, if the non-permanent communication link is not-available, queuing the received message for future transmission, and providing the message to a transport/network layer if the communication link is available.

25 Claims, 7 Drawing Sheets

OTHER PUBLICATIONS

State Intellectual Property Office of People's Republic of China, "Second Office Action for corresponding Chinese Patent Application No. 200680000245.8", dated Jul. 13, 2011, China.

European Patent Office, "European Search Report" for corresponding EP Patent Application No. 06741393.0 dated Sep. 20, 2007, Germany.

European Patent Office, "Communication Pursuant to Article 94(3) EPC" for corresponding EP Patent Application No. 06741393.0 dated Mar. 19, 2008, Germany.

IPulse, Response to EPO Communication of Mar. 19, 2008, for corresponding EP Patent Application No. 06741393.0, dated Jul. 30, 2008, United Kingdom.

Canadian Intellectual Property Office, "International Search Report" for corresponding PCT Application No. PCT/CA2006/000615, dated Aug. 25, 2006, Canada.

Mian, Ali—Canadian Intellectual Property Office, "Examiner's Requisition" for corresponding Canadian Patent Application No. 2,562,182, dated Aug. 28, 2012, Canada.

* cited by examiner

METHOD FOR HANDLING COMMUNICATIONS OVER A NON-PERMANENT COMMUNICATION LINK

CROSS-REFERENCE TO RELATED APPLICATIONS

This application is based on, and claims benefit of 35 U.S.C. §119(e) of Provisional Patent Application No. 60/672,082 filed Apr. 18, 2005, which is hereby incorporated by reference. This application is also a continuation of U.S. patent application Ser. No. 11/405,594, the entirety of which is hereby incorporated by reference.

FIELD OF APPLICATION

The instant application relates to the field of communications. More precisely, this application pertains to a method for handling communications over a non-permanent communication link.

BACKGROUND OF THE ART

Wireless data communication devices are now widespread due to the fact that they are popular with users.

Such wireless data communication devices are usually provided with a plurality of applications such as an electronic messaging application, an Internet browser application, an instant messaging (IM) application, etc.

In use, a wireless data communication device may be located temporarily in a zone where the wireless connection is not available anymore. The wireless data communication device is hence out of coverage.

In such case, outbound messages (also referred to as outgoing messages or messages to transmit) generated from the applications running on the wireless communication device will therefore become undeliverable to any server. More precisely, for each outbound message, the transport/network layer reports individually to each application that its message transmission failed. The application must then be programmed accordingly to handle such failure.

The skilled addressee will appreciate that such situation creates a large overhead especially in the case where there is a large number of messages to transmit by a plurality of applications.

The skilled addressee will further appreciate that frequent radio communication attempts will significantly reduces the battery life of a wireless data communication device.

There is a need for a method that will overcome at least one of the above-identified drawbacks.

Features of the application will be apparent from review of the disclosure, drawings and description below.

DESCRIPTION OF THE DRAWINGS

In order that the application may be readily understood, embodiments are illustrated by way of example in the accompanying drawings.

DETAILED DESCRIPTION

According to a first aspect, there is provided a method for handling communications over a non-permanent communication link. The method comprises centrally receiving a message to transmit from at least one application among a plurality of applications, checking the availability of the non-permanent communication link, if the non-permanent communication link is not-available, queuing the received message for future transmission, and providing the message to a transport/network layer if the communication link is available.

According to another aspect, there is provided a communication management unit for handling communications from a plurality of applications to a transport/network layer and over a non-permanent communication link. The communication management unit comprising: a dispatching unit receiving a message to transmit at least one application among the plurality of applications; a queuing control unit for checking the availability of the non-permanent communication link; and a queue for queuing the received message if the non-permanent communication link is not-available, and for providing the message to a transport/network layer if the communication link is available.

In the following description of the embodiments, reference to the accompanying drawings is by way of illustration of examples. It will be understood that other embodiments may be made without departing from the scope of the application disclosed.

Figure 1:
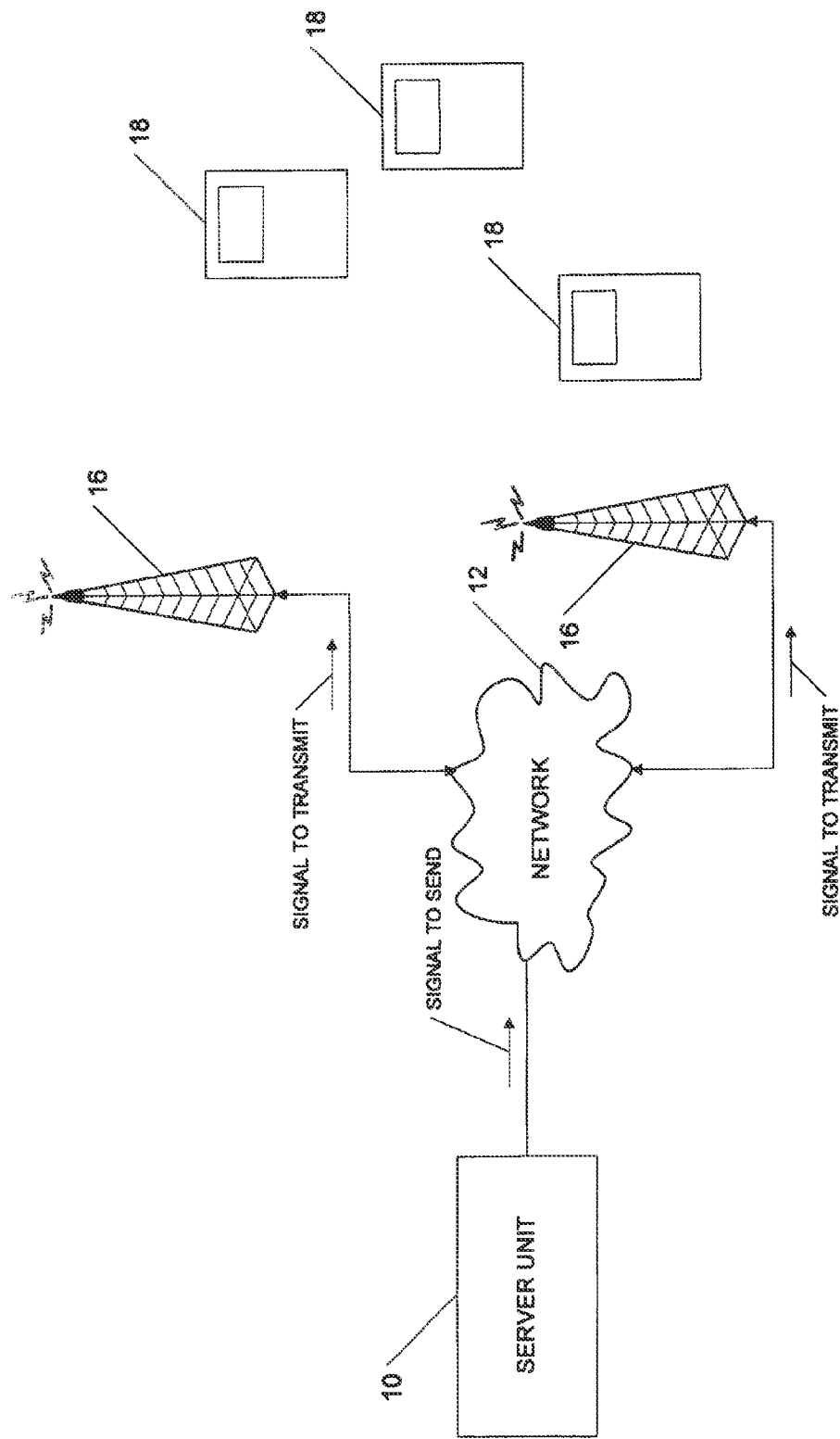
FIG. 1 is a block diagram which shows a system where the method for handling communications over a non-permanent communication link may be advantageously used.

Now referring to FIG. 1, there is shown an embodiment of a system wherein the method for handling communications over a non-permanent communication link disclosed below may be advantageously used.

The system comprises a server unit 10, a network 12, a plurality of transmitting devices 16 and a plurality of user devices 18.

The server unit 10 is adapted for providing a signal to send to the plurality of user devices 18 over a communication link. In the present embodiment, the communication link is an air interface and is not shown. The server unit 10 may comprise any type of processing unit that is connected permanently or temporarily with the plurality of user devices 18.

The network 12 comprises at least one of a Local Area Network (LAN), a Metropolitan Area Network (MAN) and a Wide Area Network (WAN). In an embodiment, the network 12 comprises a Wide Area Network which is the Internet.

The plurality of transmitting devices 16 comprises wireless transmitters adapted to transmit data to the plurality of user devices 18.

The plurality of user devices 18 comprises devices that are adapted to process at least data. In one embodiment, shown in FIG. 1, the plurality of user devices 18 are wireless user devices. It should be appreciated that various types of devices may be used such as Personal Digital Assistants (PDAs), smart phones, etc. In an embodiment, the plurality of user devices 18 comprises BlackBerry™ devices which are manufactured by Research In Motion Limited.

More precisely, the server unit 10 is adapted to provide to the network 12, inter alia, a signal to send.

At least one of the plurality of transmitting devices 16 is adapted to transmit a signal to at least one of the plurality of user devices 18.

Figure 2:
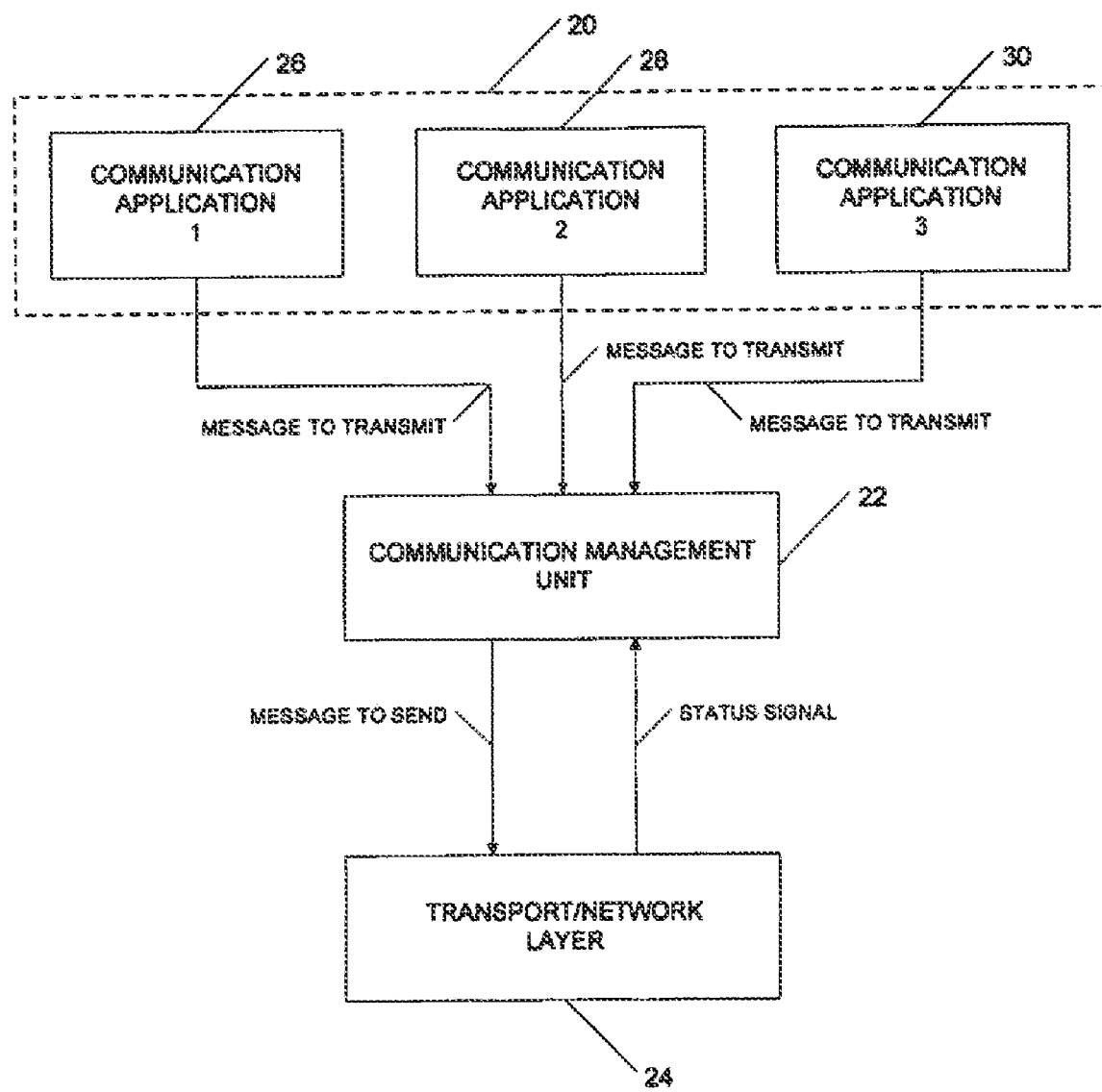
FIG. 2 is a block diagram showing a plurality of communication applications communicating with a transport/network layer using a communication management unit in accordance with an embodiment.

Now referring to FIG. 2, there is shown how a plurality of applications 20 communicates with a transport/network layer 24. It should be appreciated that in the embodiment disclosed herein, the plurality of applications 20 is located on at least one of the plurality of user devices 18 (from FIG. 1). Alternatively, the plurality of applications may be located on the server unit 10 (from FIG. 1).

A communication management unit 22 is provided and is adapted for receiving at least one message to transmit which is provided by the plurality of applications 20. The communication management unit 22 is further adapted for providing the provided messages to transmit to the transport/network layer 24.

In an embodiment herein, the communication management unit 22 is implemented as a system-level container. It will be further appreciated that the communication management unit 22 is adapted for listening for events related to the network coverage status of the user device 18. These events are generated by a lower-level transport layer, also referred to as transport/network layer 24. The transport/network layer 24 may use a polling solution where it periodically attempts to open a successful connection to the network to detect the status of the wireless device 18. However, the transport layer designer may use some other solutions to consistently update the status of the wireless device 18. When the communication management unit 22 receives an event from the transport layer indicating that the device is out of coverage, it starts queuing messages provided by anyone of the plurality of applications 20 and does not attempt to transmit any through the transport/network layer 24. It will be appreciated and further shown below that a queue may be chosen according to various criteria. In fact there may be a queue per destination server (i.e. the criterion is the destination server of a message), as in an embodiment, a queue per application (i.e. the criteria is a number of application), a single queue, or the like, depending on requirements. When the communication management unit 22 receives an event from the transport layer indicating that the device is in coverage, it resumes transmission of messages through the transport/network layer 24. It will be appreciated that in one embodiment, the communication management unit 22 is also aware of the different servers that the plurality of applications might communicate with. Such information may be obtained at the application installation time, or, as in an embodiment, when a handshake between the system containing the communication unit and each server initially takes place. After such handshake, the application communicating with that server may be installed. It will be appreciated that each server has to be notified that the wireless device 18 is back in coverage and any messages queued on the server should then be sent to the applications, which can be done by sending any type of messages to the server. So if there is at least one application message to send to the server, the application message is sent. Alternatively, a special "Heartbeat" message may be sent. When the server successfully receives a message from the wireless device 18 that was previously unreachable, the server resumes transmission of messages to this device.

In the embodiment disclosed, the plurality of applications 20 comprises a first communication application 26, a second communication application 28 and a third communication application 30.

Still in the embodiment disclosed in FIG. 2, the first communication application 26 provides a first message to transmit to the communication management unit 22, while the second communication application 28 provides a second message to transmit to the communication management unit 22, and the third communication application 30 provides a third message to transmit to the communication management unit 22.

The communication management unit 22 receives a status signal provided by the transport/network layer 24. The status signal is indicative of the availability of the communication link which is intended to be used for transmitting the messages. The communication management unit 22 provides at least one message to send to the transport/network layer 24 of the user device 18.

The transport/network layer 24 transmits the message to send over the communication link (not shown here).

Figure 3:
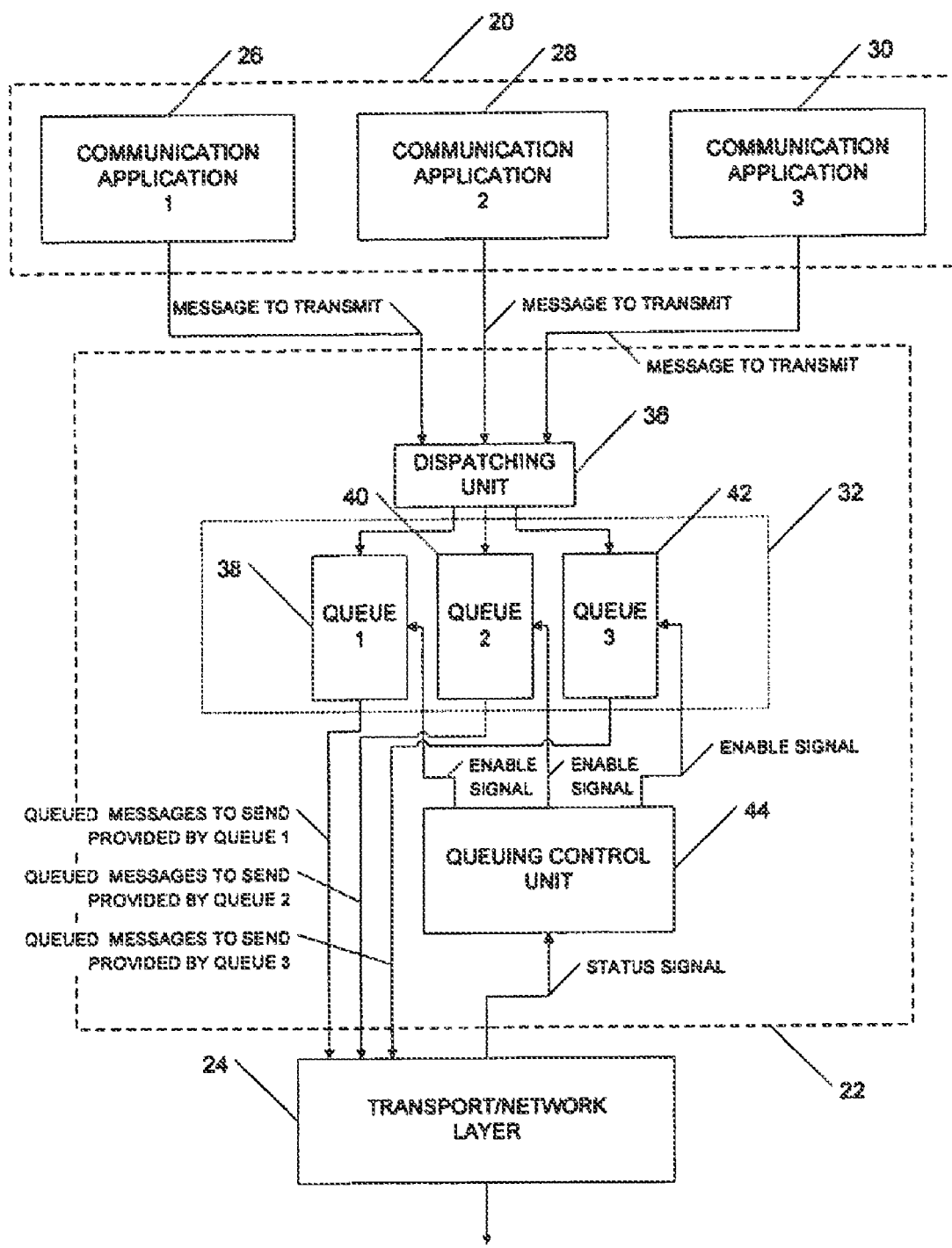
FIG. 3 is a block diagram showing, inter alia, an embodiment of the communication management unit; in this embodiment, the communication management unit comprises a dispatching unit, a plurality of queues and a queue control unit.

Now referring to FIG. 3, there is shown an example of the communication management unit 22.

In the embodiment disclosed in FIG. 3, the communication management unit 22 comprises a dispatching unit 36, a plurality of queues 32, and a queuing control unit 44.

The dispatching unit 36 receives the plurality of messages to transmit provided by the plurality of applications 20.

The dispatching unit 36 is adapted for sorting the plurality of messages according to at least one criterion. In one embodiment, the criterion is the destination server for the message. In fact, the skilled addressee will appreciate that a first given message may be intended to be delivered to a first server while a second given message may be intended to be delivered to a second given server.

Each of the plurality of queues 32 is used for storing at least one of the plurality of messages to transmit provided by the plurality of applications 20 to the communication management unit 22.

In one embodiment, the number of queues of the plurality of queues 32 depends on the at least one criterion disclosed above.

The communication management unit 22 further comprises a queuing control unit 44. The queuing control unit 44 is adapted for controlling the plurality of queues 32. In the embodiment disclosed, the queuing control unit 44 receives a status signal provided by the transport/network layer 24 and provides a plurality of corresponding enable signals to each queue of the plurality of queues 32. The enable signal provided to a given queue is indicative of an available communication link and is therefore used to empty the given queue. It will be appreciated that the enable signal may be provided to each of the plurality of queues 32 according to various strategies depending on the type of queues.

Each of the queues of the plurality of queues 32 provides corresponding queued messages to send to the transport/network layer 24.

In the embodiment disclosed in FIG. 3, the plurality of queues 32 comprises a first queue 38, a second queue 40 and a third queue 42. It will be appreciated by the skilled addressee that in an embodiment no maximum site is set for a given queue. However, a limit is preferably set using a number of pending messages to send from any one of the plurality of applications 20. Still in an embodiment, the limit is the lower of a maximum number of outbound pending messages for a given application stated by either the system within which the given application is running or the given application itself at the installation time. The limit is imposed by the communication management unit 22. Once the limit is reached, the given application notified. It is up to the given application to prevent the user from sending any further messages. The communication management unit 22 rejects then all message from the given application after the limit is reached. The application has then to perform the necessary handling of the rejected messages.

The queuing control unit 44 disclosed in FIG. 3 may provide a first enable signal to the first queue 38, a second enable signal to the second queue 40 and a third enable signal to the third queue 42 when the communication link is available.

In response to the first enable signal, the first queue 38 may provide corresponding queued messages to send to the transport/network layer 24, while in response to the second enable signal, the second queue 40 may provide corresponding queued messages to send to the transport/network layer 24 and in response to the third enable signal, the third queue 42 may provide corresponding queued messages to send to the transport/network layer 24.

Figure 4:
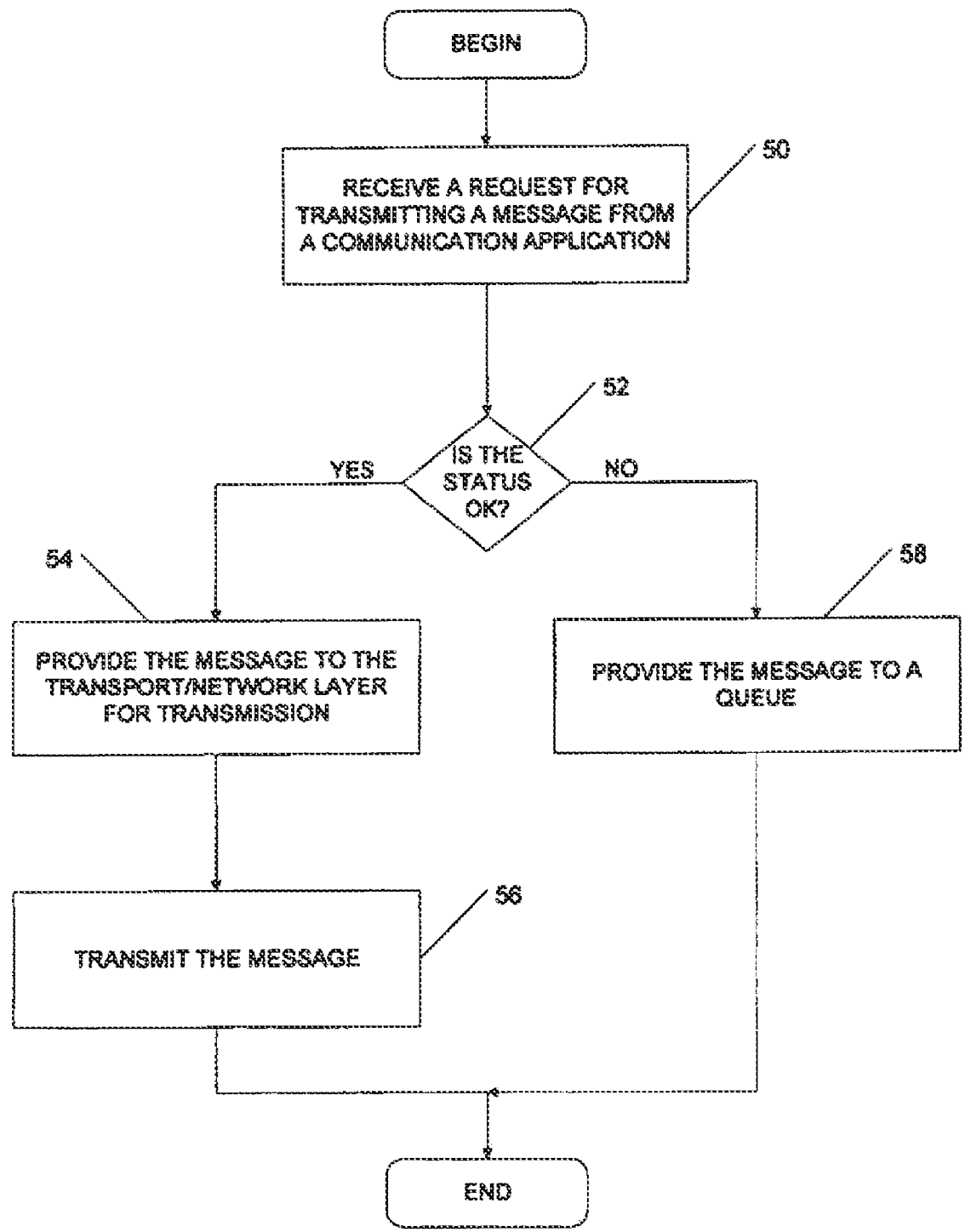
FIG. 4 is a flowchart which shows a method where a communication application communicates according to an embodiment; a check to find out if a communication link is available is performed.

Now referring to FIG. 4, there is shown an embodiment which shows how a communication application communicates according to an embodiment.

According to step 50, a request for transmitting a message is received from a communication application. The request is received by the communication management unit 22.

In one embodiment, the message is directly provided to the communication management unit 22.

According to step 52, a check is performed order to find out if the communication link is available. In an embodiment, the check is performed by checking the status of a state variable belonging to the queue for the outgoing message. The state variable is set to one of "Enabled" (i.e. the communication link is available) or "Disabled" (i.e. the communication link is not available). The skilled addressee should appreciate that the state variable is set to one of "Enabled" and "Disabled" depending on the received event provided by the transport/network layer 24. It should be appreciated that preferably the state variable is maintained independently for each queue as there may be additional reasons to not send any messages to a server even when the device is in coverage, such as the remote server being down for instance. The state of the queue is checked to see if new messages should be sent or kept queued.

In the case where the communication link is not available and according to step 58, the message to transmit is provided to a queue. In an embodiment, the message is provided to a queue of the plurality of queues 32.

In the case where the communication link is available and according to step 54, the message is provided to the transport/network layer 24 (see FIG. 2) for transmission.

According to step 56, the message is transmitted by the transport/network layer 24.

Figure 5:
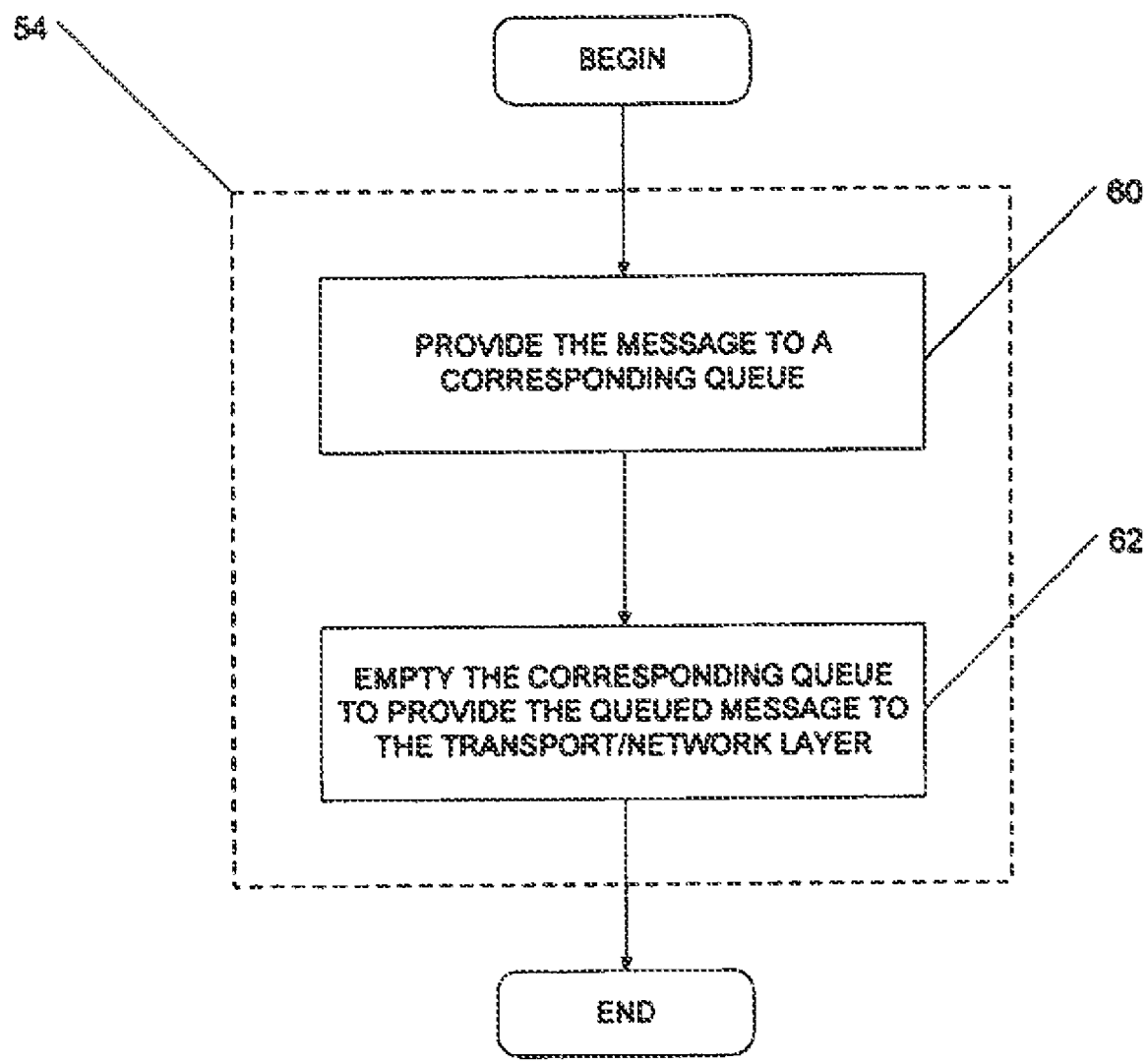
FIG. 5 is a flowchart which shows a method where a message is provided to the transport/network layer for transmission in the case where a communication link is available.

Referring to FIG. 5, there is shown how the message to transmit is provided to the transport/network layer 24 (see FIG. 2) for transmission according to one embodiment.

According to step 60, the message to transmit. is provided to a corresponding queue. As explained above, the message to transmit is provided to a corresponding queue depending on various criteria. In this embodiment, the message to transmit is provided to a corresponding queue using the dispatching unit 36 (see FIG. 3).

According to step 62, the corresponding queue is emptied to provide the queued message to the transport/network layer 24. Still in this embodiment, the corresponding queue is emptied using an enable signal provided by the queuing control unit 44 (see FIG. 3).

Figure 6:
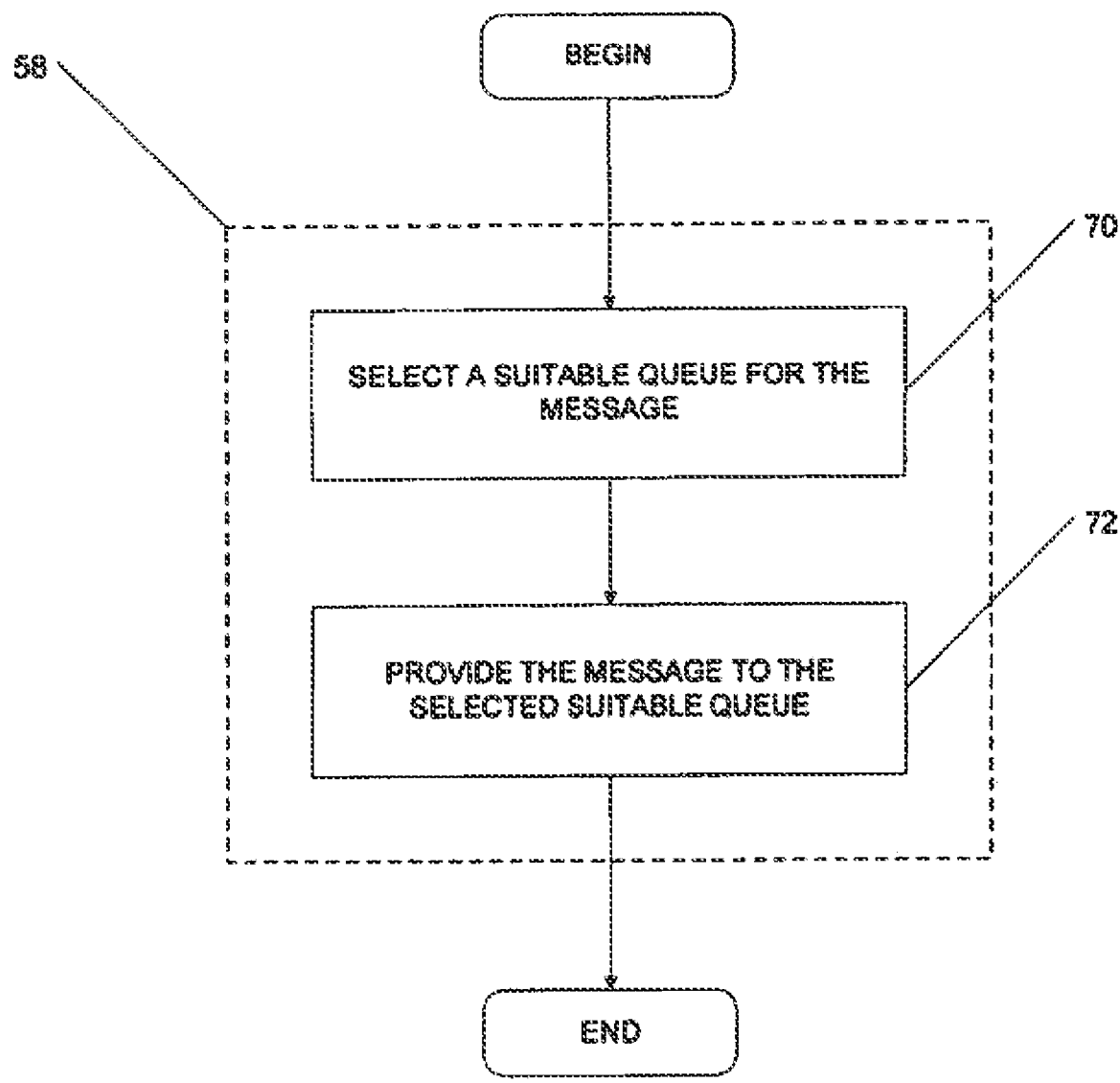
FIG. 6 is a flowchart which shows a method where a message is provided to a queue in an embodiment; according to a first step, a suitable queue is selected and according to a second step, the message is provided to a selected suitable queue.

Now referring to FIG. 6, there is shown how the message to transmit is provided to a queue in the case where the communication link is not available.

According to step 70, a suitable queue is selected for the message to transmit. The suitable queue is selected amongst the plurality of queues 32 using the dispatching unit 36 (see FIG. 3) depending on at least one criterion as explained above.

According to step 72, the message to transmit is provided to the selected suitable queue.

Figure 7:
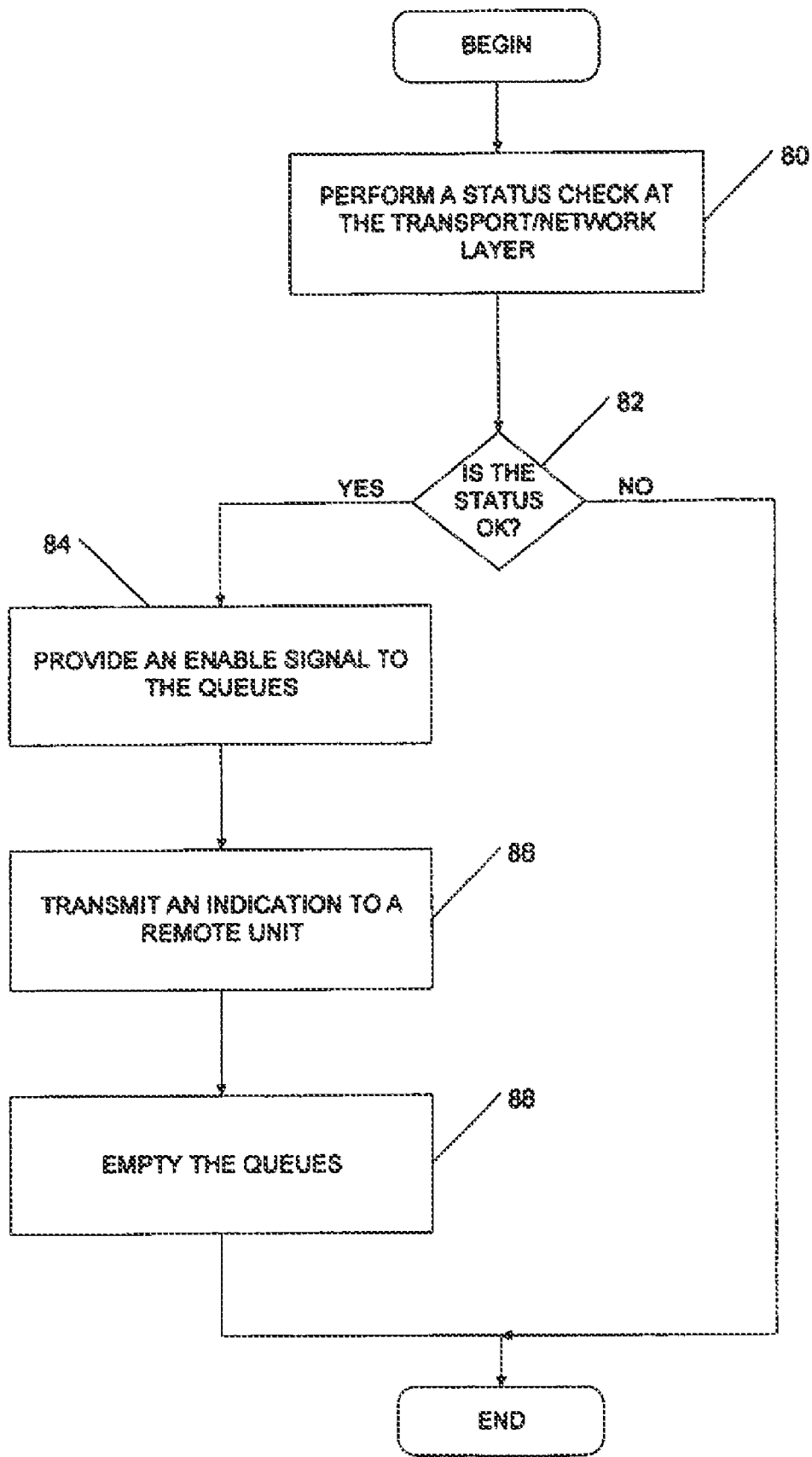
FIG. 7 is a flowchart which shows a method which takes into account what happens when a check is performed to find out if a communication link is available.

Now referring to FIG. 7, there is shown what happens in the case where a communication link becomes available.

According to step 80, a status check is performed at the transport/network layer 24 (see FIG. 2).

According to step 82, a check is performed in order to find out if the communication link is now available.

In the case where the communication link is available and according to step 84, an enable signal is provided to the plurality of queues 32.

According to step 86, an indication is provided to a remote unit. In fact, the indication is used to inform the remote unit to which user device 18 it is connected with via the communication link so that user device 18 may be reregistered on the remote unit.

According to step 88, the plurality of queues are emptied.

The skilled addressee will appreciate that without the communication management unit 22, each of the plurality of applications 20 would have to individually listens for and handle the coverage events. Moreover, the skilled addressee will further appreciate that other various types of events have to be handled. For instance, "Radio On/Off" events are produced when a user turns the radio/wireless coverage off or on. The skilled addressee will appreciate that the communication management unit 22 is capable of handling all events related to network coverage and translating them into whether or not it is possible to send a message.

It should be noted that the present invention can be carried out as a method, can be embodied in a system, a computer readable medium (or memory) or an electrical or electromagnetical signal.

Although the above description relates to a specific embodiment as presently contemplated by the inventor, it will be understood that the application in its broad aspect includes mechanical and functional equivalents of the elements described herein.

The invention claimed is:

1. A method, the method comprising:
providing a communication management unit for execution on a user device capable of running a plurality of applications, the communication management unit adapted to:
receive a message for transmission from an application running on the user device;
determine whether a communication link is available for transmission of the message over the communication link, the communication link being available when the user device is able to establish communications with a server in a communications network and the communication link being not available when the user device is unable to establish communications with the server in the communications network;
if the communication link is available, provide the message to the transport/network layer for transmission over the communication link; and if the communication link is not available, queue the message in a queue until the communication management unit determines that the communication link is available.

2. The method as claimed in claim 1, wherein the communication management unit is adapted to select at least one of one or more queues in which to queue the message.

3. The method as claimed in claim 2, wherein the one or more queues comprise at least one of: at least one queue per application and at least one queue per destination.

4. The method as claimed in claim 1, wherein the communication management unit is adapted to receive a status signal from the transport/network layer indicative of availability of the communication link.

5. The method as claimed in claim 4, wherein the status signal is received in response to at least one event occurring at the transport/network layer.

6. The method as claimed in claim 4, wherein the status signal is received in response to a request from the communication management unit for a status check.

7. The method as claimed in claim 1, wherein the at least one queue includes a first queue that is associated with a queue limit.

8. The method as claimed in claim 7, wherein the queue limit is based on a maximum number of messages to send for a given application, the first queue being designated to queue messages from the given application.

9. The method as claimed in claim 7, wherein when the first queue reaches the queue limit, a limit notification is provided to the given application.

10. The method as claimed in claim 9, wherein the given application generates a user notification upon receipt of the limit notification.

11. The method of claim 1, wherein the communication management unit is adapted to receive messages for transmission from the plurality of application on the user device.

12. A wireless communications device capable of running a plurality of applications, the wireless communications device comprising:
a transmitter adapted to transmit messages via a wireless communications network over a communications link;
a transport/network layer adapted to report events related to the availability of the communications link; and
a processor for executing code to implement a communication management unit for carrying out a communication management function, the code, when executed, causing the communication management unit to:
receive a message for transmission from an application running on the device;
determine whether a communication link is available for transmission of the message over the communication link, the communication link being available when the device is able to establish communications with a server in a communications network and the communication link being not available when the device is unable to establish communications with the server in the communications network;
if the communication link is available, provide the message to the transport/network layer for transmission over the communication link; and
if the communication link is not available, queue the message in a queue until the communication management unit determines that the communication link is available.

13. The device as claimed in claim 12, wherein the code further causes the communication management unit to select at least one of one or more queues in the communication management unit in which to queue the message.

14. The device as claimed in claim 13, wherein the one or more queues comprise at least one of: at least one queue per application and at least one queue per destination.

15. The device as claimed in claim 12, wherein the code further causes the communication management unit to receive a status signal from the transport/network layer indicative of availability of the communication link.

16. The device as claimed in claim 15, wherein the status signal is received in response to at least one event occurring at the transport/network layer.

17. The device as claimed in claim 16, wherein the status signal is received in response to a request from the communication management unit for a status check.

18. The device as claimed in claim 12, wherein the at least one queue includes a first queue that is associated with a queue limit.

19. The device as claimed in claim 18, wherein the queue limit is based on a maximum number of messages to send for a given application, the first queue being designated to queue messages from the given application.

20. The device as claimed in claim 18, wherein when the first queue reaches the queue limit, a limit notification is provided to the given application.

21. The device as claimed in claim 20, wherein the given application generates a user notification upon receipt of the limit notification.

22. The device as claimed in claim 12, wherein the code further causes the communication management unit to receive messages for transmission from the plurality of application on the device.

23. A non-transitory computer readable memory comprising instructions which when executed by a communication management unit of a device causes the communication management unit to perform the operations of:
receiving at least one message for transmission from at least one application running on the device;
checking a transport/network layer associated with a communication link to determine whether the communication link is available for transmission of the at least one message over the communication link, the communication link being available when the device is able to establish communications with a server in a communications network and the communication link being not available when the device is unable to establish communications with the server in the communications network;
when the communication link is available, providing the at least one message to the transport/network layer for transmission over the communication link; and
otherwise, when the communication link is not available, queuing the at least one message in at least one queue until the communication management unit determines that the communication link is available.

24. The non-transitory computer readable memory as claimed in claim 23, wherein checking comprises receiving a status signal from the transport/network layer indicative of availability of the communication link.

25. The non-transitory computer readable memory as claimed in claim 24, wherein the status signal is received in response to at least one event provided by the transport/network layer.

* * * * *